United States Patent [19]

Farmer et al.

[11] 3,950,042
[45] Apr. 13, 1976

[54] MEANS FOR STABILIZING A ROTARY MEMBER

[75] Inventors: Donald Allen Farmer, North Haven, Conn.; Lucian Kops, Montreal, Canada

[73] Assignee: American Chain and Cable Company, Inc., Bridgeport, Conn.

[22] Filed: June 5, 1974

[21] Appl. No.: 476,440

[52] U.S. Cl. ................................................ 308/9
[51] Int. Cl.² .......................................... F16C 35/00
[58] Field of Search ........... 308/9, 5 R, 8, 135, 160, 308/DIG. 1; 51/168; 74/574

[56] References Cited
UNITED STATES PATENTS

| | | | |
|---|---|---|---|
| 3,493,273 | 2/1970 | Greenberg | 308/9 |
| 3,635,533 | 1/1972 | Galloway | 308/9 |
| 3,767,277 | 10/1973 | Woolcock | 308/9 |
| 3,837,716 | 9/1974 | Allen et al. | 308/9 |

FOREIGN PATENTS OR APPLICATIONS

| | | | |
|---|---|---|---|
| 1,213,959 | 11/1970 | United Kingdom | 308/9 |

*Primary Examiner*—Robert J. Spar
*Assistant Examiner*—Randolph A. Reese
*Attorney, Agent, or Firm*—Pennie & Edmonds

[57] ABSTRACT

A means for stabilizing a large diameter - to - thickness ratio wheel to prevent axial flutter of the wheel at high wheel speeds is disclosed. The wheel is supported for rotation through a gap formed by at least one pair of spaced bearing plates. Each bearing plate provides a relieved area in the side juxtaposed to the wheel, the non-relieved area of the bearing plate and the wheel surface defining a nozzle directed generally toward the periphery of the wheel. The gap spacing is adjustable. Means are provided for introducing fluid through each bearing plate into the relieved area on both sides of and at circumferentially spaced locations on the wheel face. The flow of fluid which impinges on the face is maintained constant. Through a change in direction through the gap and due to centrifugal forces the fluid moves toward the wheel periphery at increased velocity. The flowing fluid creates hydrodynamic conditions which stiffen the wheel sufficiently to prevent axial flutter. The situs of impingement of fluid on the wheel face may be adjustable.

17 Claims, 6 Drawing Figures

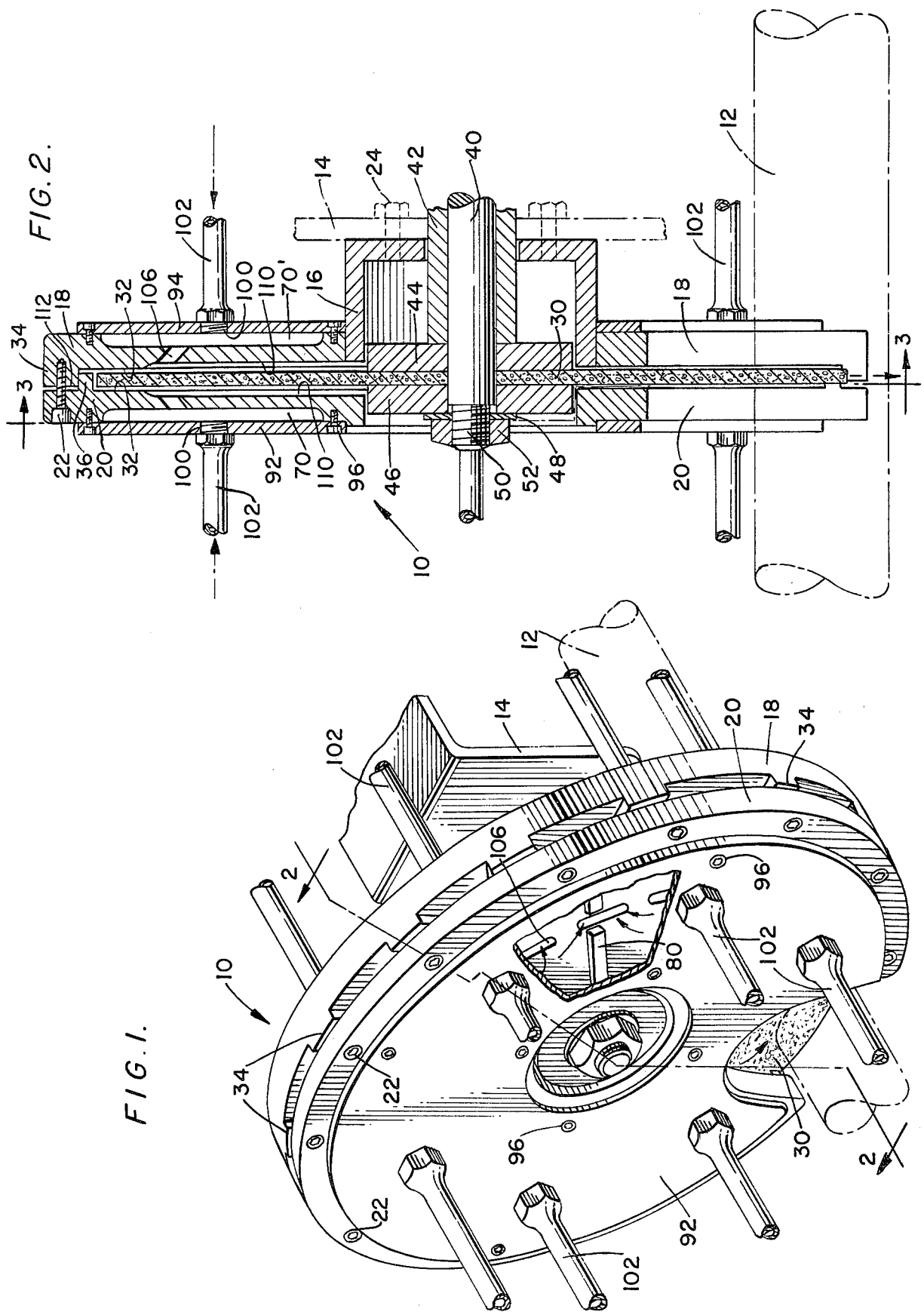

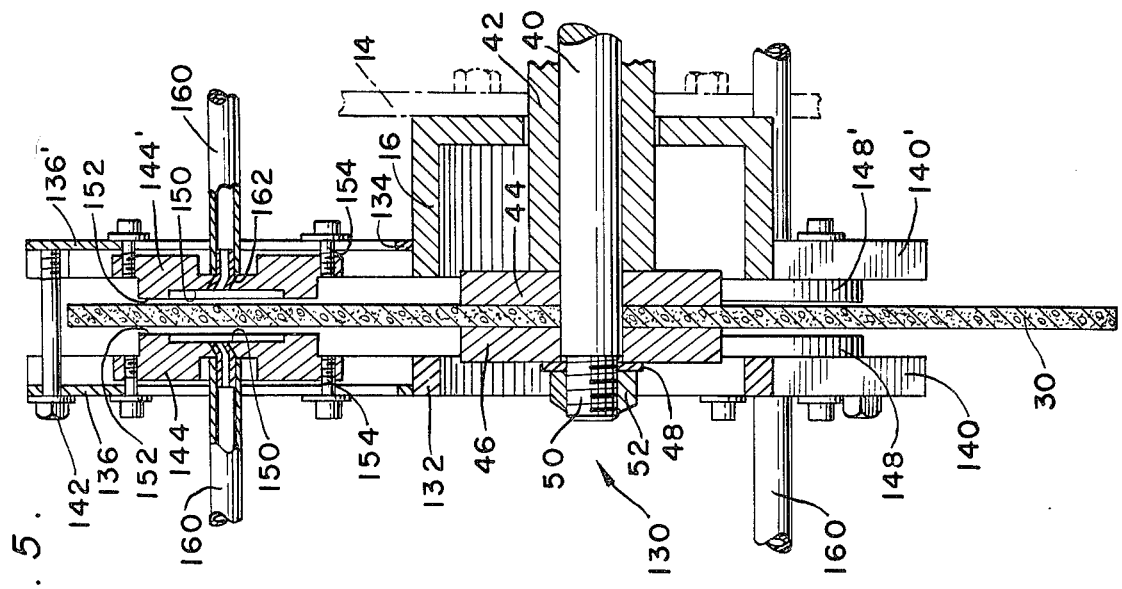
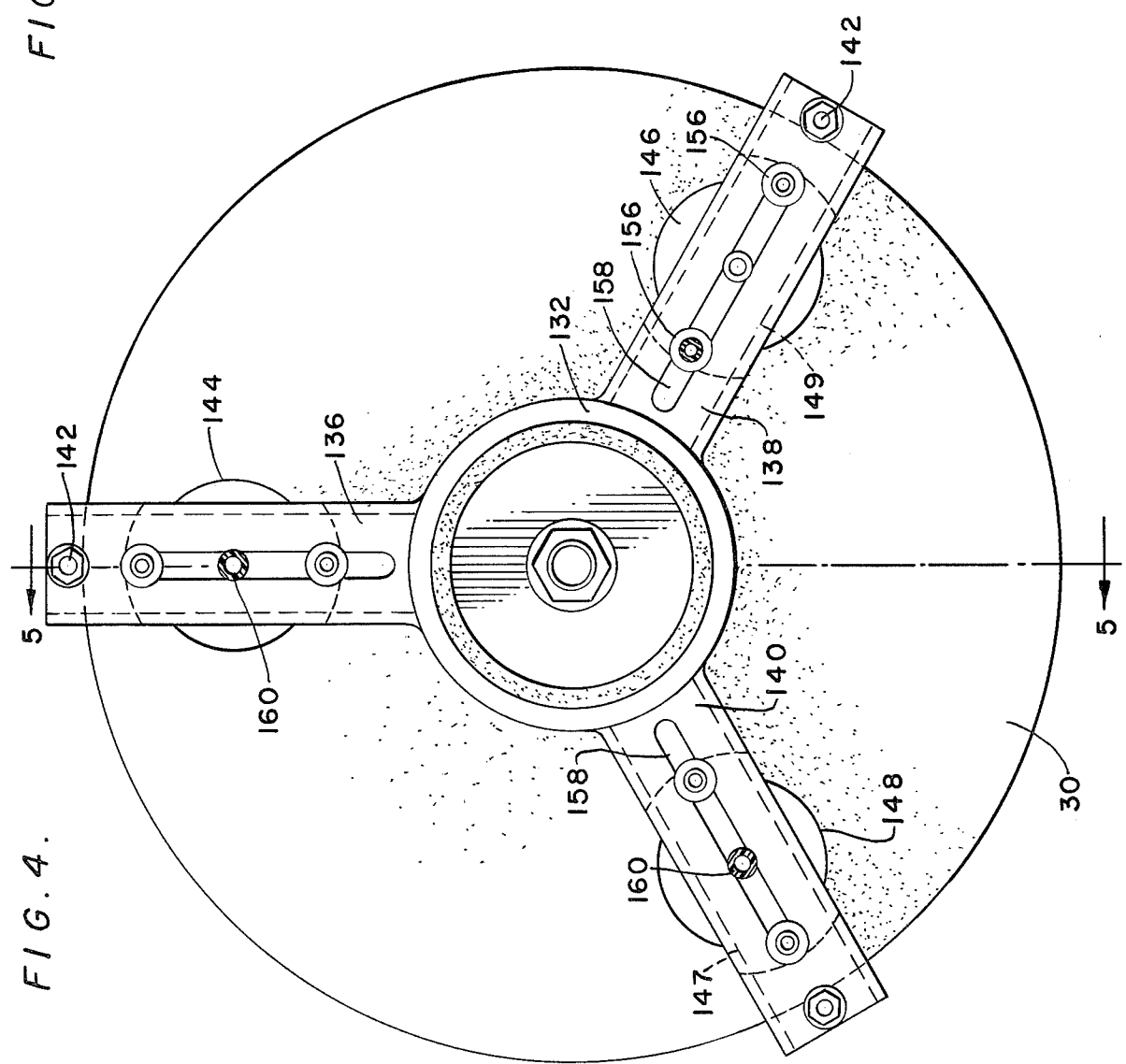

MEANS FOR STABILIZING A ROTARY MEMBER

The present invention relates to rotary wheels for use in cutting; and, particularly to the manner and means for stabilizing a large diameter - to - thickness ratio abrasive wheel thereby to prevent axial flutter of the outer peripheral reaches of the wheel when subject to high wheel speeds and under conditions when contacting a workpiece.

BACKGROUND OF THE INVENTION

Commercial wheels, such as abrasive cut-off wheels, generally are formed to present a large diameter - to - thickness ratio. In this manner it is found that kerf loss and power requirements may be kept to a minimum. A construction of this form, however, requires stabilization to prevent buckling and breakage of the wheel when subjected to heavy feed forces. Further, stabilization is required thereby to eliminate substantially axial flutter of the peripheral wheel region when under conditions of high wheel speeds. Flutter may result in breakage of the wheel when it is brought into contact with a workpiece or vice versa.

Breakage of the wheel under these conditions may result in damage to equipment. Further, breakage of the wheel may result in injury to the operator. Both situations should be avoided.

To overcome this type of problem in connection with abrasive cut-off wheels, prior art equipment has utilized a pair of flanges, one on each side of the wheel, to provide side support for the wheel. A construction of this type suffers from the fact that if maximum usage of the wheel diameter is to be realized the flanges generally are restricted to about one-quarter of the diameter of the wheel. Such restriction results in the use of flanges, which, under most operating conditions, are not large enough to prevent axial flutter of the wheel.

BRIEF DESCRIPTION OF THE INVENTION

The present invention is directed to a form of construction and means for restraining the axial movement of a wheel as well as for preventing deflection in the peripheral reaches of the wheel without restriction of the full use of the same. The invention may be applied in general to equipment utilizing rotary wheels having large diameter - to - thickness ratios, but may be utilized to particular advantage with abrasive cut-off wheels of like outline. Accordingly, the invention will be discussed and is illustrated by the drawings with this adaptation in mind.

In one aspect, the present invention provides an abrasive cut-off wheel supported for movement on a shaft. At least a pair of bearing plates are mounted on opposed sides of the wheel and positioned adjacent its front and rear surfaces. The plates are connected together and provide a gap through which the wheel is free to rotate. The plates are secured against movement and provide means for access of fluid to the region of the gap on both sides of the wheel. Dynamic support for the wheel under conditions of high wheel speed is provided by the deflected fluid which moves generally radially outwardly along the surfaces of the wheel because of centrifugal forces at a velocity higher than the velocity of fluid impingement on the wheel. The fluid flow stiffens the wheel sufficiently to prevent axial flutter which may otherwise occur at high wheel speeds. The substantial prevention of axial flutter of the wheel under these circumstances results in a reduction of machining costs in grinding operations and in prevention of breakage of the wheel which may result from flutter condition.

Means preferably are provided for fluid flow into the gap on both sides of the wheel from a plurality of circumferentially spaced ports disposed along an annulus. As few as three pairs of ports may be used to advantage. The fluid is preferably water. Rotation of the wheel causes the support to go from hydrostatic to a hydrodynamic action which prevents axial flutter.

In a second aspect, the present invention provides a multiple of pairs of opposed bearing plates arranged circumferentially about the axis of the shaft of the abrasive wheel. Each pair of bearing plates provides a gap for wheel movement and includes port access within the region of the gap for communication of fluid to the wheel. Means are provided to adjust the radial positioning of the paired ports for directing fluid on a rotating abrasive wheel. To this end, the assembly includes as mounting support a pair of spiders including a central annular region and at least three arms extending radially outwardly therefrom. The arms are disposed in paired relation with like arms on the other side of the wheel. The spiders may be connected at or within the region of the end of each spider arm. Each bearing plate is adjustable along the length of a slot in the spider arm. Fluid is communicated to the surface and through the gap in the manner and for the reasons heretofore brought out.

The bearing plates to be accommodated by the spider arms may be of any particular shape. For example, the bearing plates may be of either round or rectangular outline. The configuration of each bearing plate in association with the supporting structure as will be described in connection with FIG. 1 is round in outline, only. The diameter of each bearing plate is chosen to accommodate the maximum diameter workpiece that can be cut within aligned openings by a wheel of given diameter. A port of cylindrical or arc-shaped outline may be provided for fluid passage to the region of the gap. The port preferably is directed outwardly of the wheel. The port axis is located at an acute angle in relation to the axis of the rotating wheel.

As a further aspect of the present invention the gap formed by the opposed surfaces of the bearing plate within which the abrasive wheel rotates may be adjustable.

There has thus been outlined rather broadly the more important features of the present invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may be readily utilized as a basis for the designing of other structures for carrying out the several purposes of the invention. It is important, therefore, that the claims be regarded as including such equivalent construction as do not depart from the spirit and scope of the invention.

DESCRIPTION OF THE DRAWINGS

The accompanying drawings form a part of the present application. By these drawings, which illustrate preferred forms of the invention;

FIG. 1 is a perspective view of a first form of the assembly including a cutting wheel and a support structure of the present invention;

FIG. 2 is a view substantially in vertical section as seen along the line 2—2 of FIG. 1;

FIG. 4 is a front elevation view of a second form of assembly of the present invention;

FIG. 5 is a vertical section as seen along the line 5—5; and,

DESCRIPTION OF THE PREFERRED EMBODIMENTS

Figure 3:
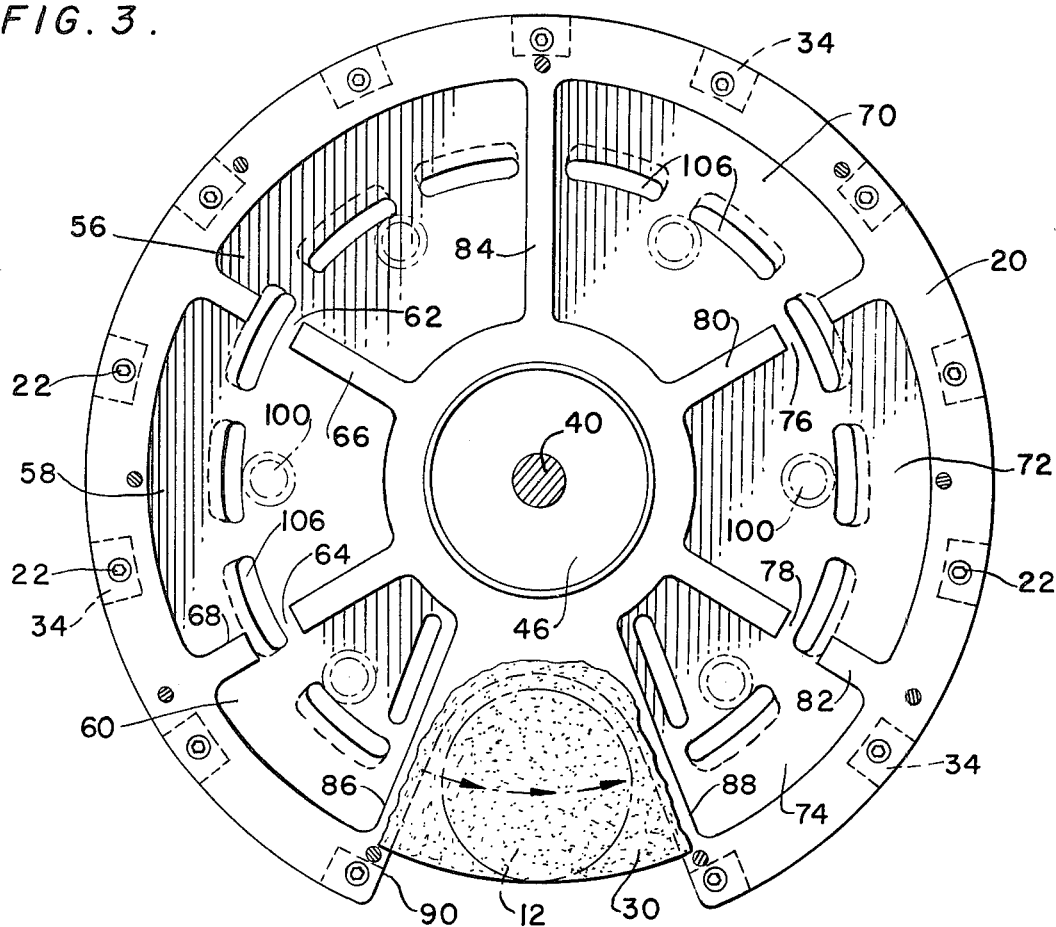
FIG. 3 is an elevation view as seen along the line 3—3 in FIG. 2.

One form of assembly of the invention may be seen to best advantage in FIGS. 1-3 of the drawings. In the figures, the assembly is denoted by the numeral 10 and generally includes a housing providing rotational support for an abrasive wheel that is adapted for use in cutting a workpiece 12 to desired length. The housing is carried by the frame structure 14. Suitably, as is well known in the art, the frame structure accommodates a movement of the assembly both toward and then away from the workpiece to be cut. The workpiece will have been stabilized relative to the abrasive wheel. As is apparent the abrasive wheel may be fixed and the workpiece moved toward the abrasive wheel for cutting.

The housing includes a mounting cup 16, a back bearing plate or pad 18, and a front bearing plate or pad 20. The housing is fixed relative to the frame structure. To this end, the bearing plates are connected together at their periphery by a plurality of machine screws 22. The back bearing plate, by means not shown, is secured rigidly to the cup 16. The cup, in turn, is carried by the frame structure 14 by means of machine screws 24.

An abrasive cut-off wheel 30 having a large diameter - to - thickness ratio is disposed for rotation within a gap 32 whose axial dimension is defined by the spacing between facing surfaces of the bearing plates 18 and 20. The axial dimension of the gap 32 may be adjustable to accommodate abrasive wheels of varying thickness. For example, the gap may accommodate for unrestricted rotation a wheel of approximately 20 inches in diameter having a diameter - to - thickness ratio of about 100 to 200 : 1. Adjustment of the spacing may be achieved by application of different spacers located within the peripheral region of both bearing plates which, as apparent, are both of a diameter in excess of the diameter of the wheel. The gap minimum dimension may be determined by the height of the annular flange 36 on bearing plate 20 which through full tightening of the screws is moved into abutting relation with the inner surface of bearing plate 18. Other degrees of tightening will result in an increase of gap space. A space to permit egress of fluid, as will be brought out, preferably should be maintained between the bearing plates. The flange will include a plurality of passages (not shown) to pass the substantially radial flow of fluid from the assembly.

The abrasive cut-off wheel is mounted for rotation on shaft 40. The mounting and positioning structure includes a collar 42, a pair of flanges 44, 46 disposed on opposite sides of the abrasive wheel, and a washer 48. The collar may be keyed or otherwise secured to shaft 40, whereas both flanges 44, 46 together with the abrasive wheel 30 are slidably received into abutting relation with the collar. Independent rotational movement of the received elements relative to the shaft may be prevented by any well known means. The shaft may provide a threaded length 50 either externally or internally of the shaft. A securing nut or bolt 52 forces the washer toward the collar and secures the components together.

The surface of both bearing plates 18 and 20 opposite the surface at the gap is cut out to define a plurality of recesses between raised ribs in respective halves of the bearing plate. The recesses 56, 58 and 60 within the left half of the bearing plate 20 (FIG. 3) communicate, one with the other, through the passages 62 and 64 in the raised radial ribs 66, 68, respectively. The recesses 70, 72 and 74 within the right half of bearing plate 20 are similarly defined. Thus, passages 76 and 78 are formed within raised radial ribs 80, 82, respectively. The raised radial rib 84 segregates one group of recesses from the other group. The raised radial ribs 86 and 88 close the recesses at the opening 90.

The recess structure in bearing plate 18 is formed as a mirror image.

A pair of annular cover plates 92 and 94 are received on and supported by bearing plates 18 and 20 to enclose the recesses to form a pair of chambers having plural interconnecting compartments. Each cover is secured on the respective bearing plate by machine screws 96.

A plurality of access openings 100 are formed in each plate. The surface of each opening is threaded or otherwise formed to provide a mount for individual conduit elements 102 which are communicated to a source of fluid (not shown). Each compartment is provided with an access opening and conduit element. The individual compartments in each chamber act to provide a reservoir for the entering fluid. As will be described, a constant outflow of fluid from the chamber to the surface of the wheel is desired. Therefore, the flow volume of fluid communicated to the chambers once the chambers are filled will be at some steady state value dependent upon at least the size of the communication opening from the chambers to the wheel and the desired velocity of fluid flow to the wheel. It has been found that a high velocity flow is not a requirement of successful implementation of the inventive concept. If sealing of the cover to the housing in order to prevent leakage is necessary, resort may be had to the use of O-rings or equivalent structure as is well known.

In the FIGS. 1–3 embodiment of the present invention outflow of fluid from each reservoir is through a plurality of openings 106. The openings to the gap 32 may be of various outlines. For example, the opening may be of cylindrical outline, or may be in the form of an arcuate slot, or other similar form. In the FIGS. 1–3 embodiment the openings are of arc-shaped slot outline. The openings may be formed within each bearing plate at an angle measured from the axis of rotation toward the periphery of the abrasive wheel which may be within the range of from about 20° to about 50°. An opening directed toward the wheel surface at an angle of about 45° has been used to advantage and this angle is preferred. As illustrated in the figures, the several openings on each side of the abrasive wheel are similarly directed and are disposed at equal radii from the axis of the wheel. In this manner and since the flow is constant no unbalancing forces are directed on the abrasive wheel surface.

Each of bearing plates 18 and 20 are relieved along a portion of the inner annular surface area. The area of relievement is illustrated at 110. In the FIGS. 1–3 embodiment the openings are disposed at the outer portion of the relieved area near the gap 32 so that the fluid passes relatively quickly into what may be considered a nozzle between the abrasive wheel and the non-relieved surface of each bearing plate. The nozzles are directed toward the periphery of the abrasive wheel. The openings are disposed within the diametric limits of the abrasive wheel. They may be disposed at a position of substantially one-half the radius for example. In this manner, irrespective of abrading action on the abrasive wheel through wear, the action of the fluid to overcome axial flutter at high wheel speeds will not be lost.

The invention has been carried out with great success through the use of a liquid as the fluid medium for stabilizing the abrasive wheel against axial flutter at high speeds. For purposes of discussion without intent to limit the invention the liquid will be considered water. To this end, the conduit elements 102 which communicate with the openings in both bearing plates 18 and 20 are connected in fluid line to a pump (not shown). When steady state condition is reached, the pump supplies water from a common source at a rate so that the reservoir maintains full volume and a constant water flow may be maintained at the entrance to the nozzle. The water is caused to impinge upon the surface of the abrasive wheel. The water is deflected and "picked up" by the rough, porous nature of the surface and moved by centrifugal force at a velocity higher than the velocity of impingement toward and through the nozzle and toward the periphery of the abrasive wheel. It is believed that the flow is enhanced because the acute angle of incidence of the water on the abrasive wheel results in less turbulence at or within the area of the nozzle. The high velocity flow provides hydrodynamic support to "stiffen" the abrasive wheel sufficiently to prevent axial flutter. The water passes the abrasive wheel periphery through opening 112 between the annular flange 36 and the surface of bearing plate 18 and passes from the assembly through the cuts between the portions 34 of bearing plate 18.

Figure 6:
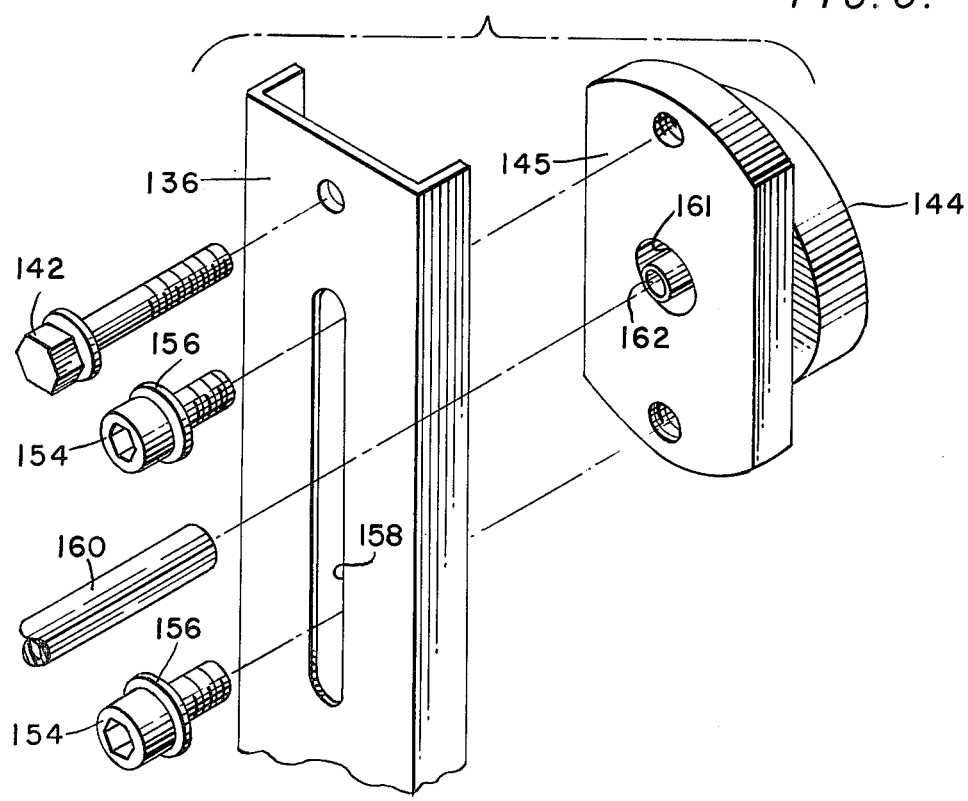
FIG. 6 is a fragmentary exploded perspective view of a portion of an arm of the assembly of FIG. 4 and a supported bearing plate.

A similar action may be obtained through use of the assembly embodied in FIGS. 4–6 of the drawings.

The principal distinction in assembly 130 of the FIGS. 4–6 embodiment resides in the construction of the housing for support of the abrasive wheel 30. To this end, the housing comprises a pair of spider elements 132 and 134 which stationarily are mounted to the frame in a manner as brought out above. To this end, each spider element includes a plurality of at least three radial arms which emanate symmetrically from a central annular supporting portion. The number of arms is limited by factors such as the diamter of the abrasive wheel, the size or cross-section of the workpiece 12 to be cut, to name a few.

Each arm, such as the arms 136, 138 and 140 (and arms 136', 138' and 140') of each spider element is channel shaped and connected to an opposed arm by a screw 142. The arms extend a radial distance slightly in excess of the diameter of the abrasive wheel 30 and are adjustable toward and away from each other to adjust the axial spacing at the gap or nozzle. Adjustment may be as described in connection with the FIGS. 1–3 embodiment.

As illustrated, the spider element 132 supports bearing plates 144, 146 and 148, whereas, the spider element 134 supports a like number of bearing plates 144', 146' and 148'. A bearing plate is mounted on each arm and each pair of bearing plates 144 and 144', and so forth, is located at a like position on opposite sides of the abrasive wheel. The manner of mounting is as discussed below.

Each bearing plate, likewise, provides a recess 150 at the entrance to a nozzle 152 directed toward the periphery of the abrasive wheel. The opening of the nozzle is located between the surface of the abrasive wheel and the surface of the respective bearing plate and, as discussed in connection with the other embodiment, is adjustable by means of screws 142. Adjustment is carried out in a manner so as not to disturb the coaxial arrangement of spider elements and the abrasive wheel.

Each bearing plate is supported by a plate, such as plates 145, 147 and 149 which may be connected to or formed integrally with the respective bearing plate, as desired. The present embodiment illustrates the plate to comprise a portion of each of the bearing plates. The portion is defined by a pair of spaced apart parallel side walls and extending outwardly arcuate end walls. Referring to FIG. 6, the portion is dimensioned for receipt within the channel of the arm 136 (or arms 138 and 140). The extended ends of the plate portion are apertured. Each aperture is threaded for receipt of the shank of screw 154.

The bearing plates are adjustable along a radial slot 158 formed in each arm. The slot may be of any desired length limited, however, by the consideration of abrading of the abrasive wheel. Again, it is preferred to dispose each bearing plate at a distance equal to about one-half the radius of the abrasive wheel. The several paired bearing plates will be adjustably located along a single annulus. The adjusted position is maintained by tightening the screws 154 and drawing the bearing plate toward the washers 156 on the opposite side of the arm 136, for example.

A conduit element, 160, by way of a couple connection 162 supported at the recess 150 to extend within the aperture 161, communicates liquid to the recess. The liquid preferably is water pumped from a single source through the flow means by pump means (not shown). Operation is as previously discussed.

The housing by means of the spider element 134 is mounted to a cup 16. The cup, in turn, is secured to the frame 14. The abrasive wheel 30, in similar manner, is mounted for rotation between the spider elements. To this end, the abrasive wheel is received on a shaft 40 and positioned by a pair of opposed flanges 44 and 46 between the collar 42 and washer 48. The collar is keyed or otherwise secured to the shaft and securement of the abrasive wheel on the shaft is carried out in the manner as discussed above.

Having described the invention with particular reference to the preferred forms thereof, it will be apparent to those skilled in the art to which the invention pertains after understanding the invention, that various changes and modifications in the manner and means to overcome axial flutter in rotating abrasive wheels may be made. The invention has been used to overcome axial flutter, the amplitude of which may be dependent upon factors such as the diameter, thickness and stiffness of the wheel, at speeds of approximately 25,000 surface feet per minute using an abrasive wheel having a 20 inch diameter and a diameter - to - thickness ratio, as described above. Modifications such as the provision of the adjustable feature of the embodiment of FIGS. 5–6 while using various shaped ports are contemplated without departing from the spirit and scope of the invention as recited by the claims appended hereto.

Having described the invention, what is claimed is:

1. A method of stabilizing a wheel having a large diameter - to - thickness ratio thereby to overcome during rotation axial flutter in the region toward the wheel periphery comprising rotating said wheel about a fixed axis through a gap formed by bearing elements spaced from each other and respective side surfaces of said wheel; arranging nozzle means in substantially balanced relation about said fixed axis on both sides of said wheel, and introducing simultaneously to each said gap on opposed sides of said wheel liquid under constant flow to impinge on said wheel surfaces, said liquid being deflected toward and through said nozzle means at a higher velocity to provide dynamic support to said wheel in the region toward its periphery.

2. Apparatus for use in stabilizing a wheel having a large diameter - to - thickness ratio thereby to overcome during rotation axial flutter in the region toward the wheel periphery comprising a supporting frame, a shaft, means mounting said wheel and shaft on said frame for joint rotation of said wheel and shaft about a fixed axis, bearing plate means disposed on opposite sides of said wheel, means mounting said bearing plate means on said frame in parallel relation and spaced from respective side surfaces of said wheel to provide a gap through which said wheel is free to rotate, nozzle means in said bearing plate means formed by the surface of said wheel and a juxtaposed surface of said bearing plate means extending from a relieved portion of said bearing plate means facing said wheel surface, said nozzle means directed substantially toward the periphery of said wheel and arranged in substantially balanced relation about said shaft, and means communicating a liquid to each relieved portion to impinge on opposite surfaces of said wheel whereby through wheel rotation and developed centrifugal forces said liquid is caused to move through said nozzle means at a higher velocity and while in contact with the surfaces of said wheel to provide hydrodynamic support for said wheel in said peripheral region.

3. The apparatus of claim 2 wherein each bearing plate means is substantially annular in outline and including mating generally wedge-shaped openings for exposure of said wheel, each said bearing plate means disposed in coaxial relation to said axis.

4. The apparatus of claim 3 wherein said means for mounting said bearing plate means includes a cup member, said cup member mounting one of said bearing plate means at the inner periphery, and means connecting said cup member to said frame.

5. The apparatus of claim 3 wherein said bearing plate means have a diameter in excess of the diameter of said wheel, means for connecting said bearing plate means including a plurality of spacing members, said spacing members being received between said bearing plate means at equi-circumferential dispositions, and threaded means securing said bearing plate means and spacing members.

6. The apparatus of claim 3 wherein said communicating means includes at least two diametrically opposed recesses in the other face of each said bearing plate means, a cover plate for closing said recesses thereby to form a pair of chambers in each bearing plate means, port means supported by said cover plates, said port means adapted to communicate fluid from a source to each said chamber, and at least one opening in each said bearing plate means within the confines of said chambers to communicate said liquid to said nozzle means.

7. The apparatus of claim 6 wherein said chambers includes a plurality of interconnecting compartments.

8. The apparatus of claim 7 wherein each said opening is generally arc-shaped and formed in said bearing plate means at an angle acute to said axis.

9. The apparatus of claim 7 including a plurality of discontinuous ribs, said ribs directed substantially radially to define the outline of said compartments.

10. The apparatus of claim 2 wherein said liquid is water.

11. The apparatus of claim 2 wherein said bearing plate means includes a plurality of bearing plate pairs arranged symmetrically around said axis, said means for mounting said bearing plate pairs including a pair of spaced members having a central annular portion and a plurality of radial arms, said arms being equal in number to the number of said bearing plate pairs, said bearing plate pairs being mounted between the ends of said arms and spaced apart to provide a gap through which said wheel is free to rotate.

12. The apparatus of claim 11 wherein said spaced members include at least three radial arms.

13. The apparatus of claim 12 wherein said radial arms extend beyond the diameterical extent of said wheel, and means for connecting said bearing plate means received within said extended length of said arms.

14. The apparatus of claim 15 wherein said connecting means permits adjustment of said gap for said wheel.

15. The apparatus of claim 13 wherein said liquid communicating means is connected to each said bearing plate, said liquid communicating means being formed by a conduit disposed within said slot.

16. The apparatus of claim 11 including means to adjust the radial positioning of each pair of bearing plate pairs, said adjusting means including a slot in each radial arm, means slidable within each slot, said slidable means being connected to each bearing plate and adapted to immovably locate said bearing plate in the adjusted position.

17. The apparatus of claim 13 wherein said liquid is water.

* * * * *

UNITED STATES PATENT AND TRADEMARK OFFICE
CERTIFICATE OF CORRECTION

PATENT NO. : 3,950,042
DATED : April 13, 1976
INVENTOR(S) : Donald Allen Farmer and Lucian Kops It is certified that error appears in the above-identified patent and that said Letters Patent are hereby corrected as shown below:

Column 8, line 40, "diameterical" should read --diametrical--;

line 44, "claim 15" should read --claim 13--;

line 58, "claim 13" should read --claim 11--.

Signed and Sealed this

Twenty-first Day of September 1976

[SEAL]

Attest:

RUTH C. MASON
Attesting Officer

C. MARSHALL DANN
Commissioner of Patents and Trademarks